United States Patent [19]

Jean-Pierre et al.

[11] Patent Number: 5,160,924
[45] Date of Patent: Nov. 3, 1992

[54] REMOTE CONTROL SYSTEM, PARTICULARLY FOR LIGHTING, IN PREMISES INCORPORATING CONTROLLABLE DISTRIBUTION ZONES WITH VARIABLE CONFORMATIONS

[75] Inventors: Jean-Pierre Conil; Henri Pierrot, both of Longvic, France

[73] Assignee: Telemecanique, France

[21] Appl. No.: 752,913

[22] Filed: Aug. 28, 1991

Related U.S. Application Data

[63] Continuation of Ser. No. 409,848, Sep. 20, 1989.

[30] Foreign Application Priority Data

Sep. 20, 1988 [FR] France .......................... 88 12239

[51] Int. Cl.$^5$ ........................................... H04M 11/04
[52] U.S. Cl. .......................... 340/825.52; 340/310 R; 340/310 A
[58] Field of Search ............ 362/85, 233; 340/310 R, 340/310 A, 310 CP, 825.06, 825.07, 825.52, 825.56

[56] References Cited

U.S. PATENT DOCUMENTS

| | | | |
|---|---|---|---|
| 3,696,383 | 10/1972 | Oishi et al. | 340/310 A X |
| 4,185,272 | 1/1980 | Feiker | 340/310 A X |
| 4,186,873 | 2/1980 | Geisler et al. | 340/310 A X |
| 4,200,862 | 4/1980 | Campbell et al. | 340/310 A |
| 4,215,276 | 7/1980 | Janeway | 340/310 A X |
| 4,418,333 | 11/1983 | Schwarzbach et al. | 340/310 A |
| 4,535,332 | 8/1985 | Miller et al. | 340/825.06 |
| 4,535,401 | 8/1985 | Penn | 340/310 R X |
| 4,916,642 | 4/1990 | Kaiser et al. | 340/310 R X |

Primary Examiner—Ulysses Weldon
Attorney, Agent, or Firm—William A. Drucker

[57] ABSTRACT

A remote-control system, in particular for lighting, is provided for premises incorporating controllable distribution zones with variable conformations, which system comprises, in the same zone to be controlled, at least one transmitter controlling a plurality of receivers each having receiver address coding means and means for controlling user appliances. In each of the receivers of the same zone to be controlled an address is coded which is assigned thereto in a pre-established fixed order and which is different form one receiver to another, whereas in the transmitter of the same zone, the list of the receivers which it controls is coded.

3 Claims, 3 Drawing Sheets

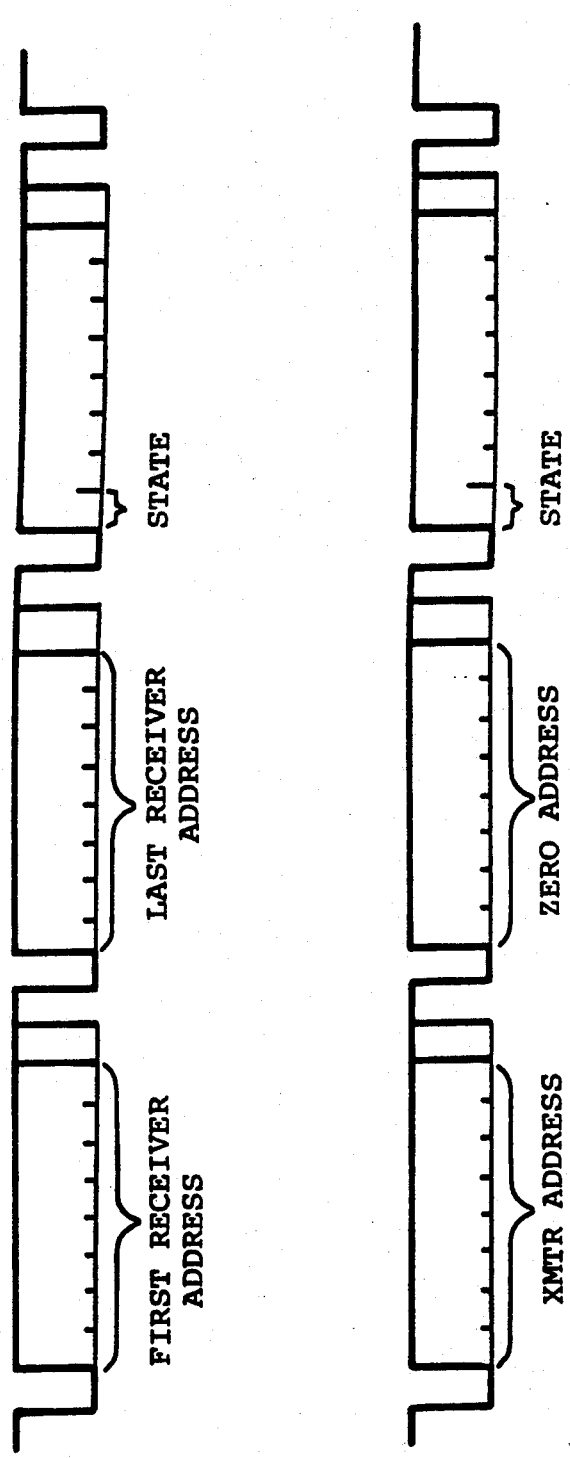

REMOTE CONTROL SYSTEM, PARTICULARLY FOR LIGHTING, IN PREMISES INCORPORATING CONTROLLABLE DISTRIBUTION ZONES WITH VARIABLE CONFORMATIONS

This application is a continuation of application Ser. No. 07/409,848, filed Sept. 20, 1989.

BACKGROUND OF THE INVENTION

The present invention relates to a remote-control system, particularly for lighting, in industrial or tertiary field premises incorporating controllable distribution zones which may be created, modified or omitted at the wish of the user.

In a system for controlling user appliances such as lighting ramps, by zones, it is known to install in each zone of the premises to be controlled, one or more transmitters which control, by coded signals transmitted over a bus, a group of receivers themselves controlling the lighting ramps. In order to provide control of the receivers associated with the different zones of the premises, in general, the same address is coded both in all the receivers of the same zone to be controlled and in the corresponding transmitter(s), this address being different from one zone to another.

However, identical coded addressing in the receivers and the transmitter(s) of the same zone to be controlled is not particularly well adapted in the case of premises having "variable geometry" in which the rooms are defined by movable partitions which the user may move depending on his needs. In fact, whenever a partition is displaced, all the receivers concerned by this displacement must be serviced to change their address, which receivers concerned may be of a large number which appreciably increases the servicing time.

The object of the present invention is to overcome this drawback and to provide a remote-control system, particularly for lighting, in premises incorporating controllable distribution zones with variable conformations, making possible zone re-configuration operations which are simple and rapid to carry out.

SUMMARY OF THE INVENTION

For this, the remote-control system of the invention, of the type comprising :
- a transmission line common to all the zones to be controlled;
- a plurality of local receivers distributed in the zones to be controlled and connected to the transmission line, each receiver being equipped with means for coding a proper receiver address and means for controlling user appliances, coding of the addresses of the receivers being different from one zone to another;
- a plurality of transmission devices connected to the transmission line and each controlling the receivers of the same zone to be controlled under the action of a control member connected to each transmission device;

is characterized by the fact that :
- the addresses of the receivers of the same zone to be controlled are coded differently with respect to each other in a pre-established fixed order;
- the transmission devices each comprise first means for coding the addresses of the receivers of the corresponding zone to be controlled.

Thus, the addresses of the receivers are frozen definitively as soon as they are positioned in the premises, so that, should there be a need to modify the zones, it is then sufficient to service only the transmission devices for changing therein the addresses of the receivers concerned.

In a first embodiment, the transmission devices are each formed by one or more local transmitters associated with the receivers of the corresponding zone to be controlled and equipped with said first coding means, each local transmitter being actuated by the control member and delivering a transmission signal capable of being detected by the receivers of the corresponding zone to be controlled.

Thus, should the zones be modified, only the local transmitters are serviced, which transmitters are appreciably less in number than the receivers, whence a reduction of the servicing time.

In a variant of construction, the transmission devices :

each comprise one or more local transmitters associated with the receivers of the corresponding zone to be controlled and equipped with second means for coding a proper transmitter address, each local transmitter being actuated by the control member and delivering a first transmission signal;

and have in common one programmable central unit connected to the transmission line and alone able to detect and process the first transmission signal delivered by each local transmitter, this unit comprising said first coding means in the form of a table of correspondence between each transmitter address and the addresses of the receivers which are associated therewith in the corresponding zone to be controlled, so that the unit delivers a second transmission signal able to be detected by the receivers of the corresponding zone to be controlled.

Thus, should the zones in the premises be modified, action is only required on the programming of the correspondence table of the central unit, whence also a reduction of servicing time.

According to one feature of the invention, the coding means belonging to each local transmitter provide :
- within the scope of the first embodiment mentioned above (system without central unit), both coding of the address of the first receiver of the corresponding zone to be controlled and coding of the address of the last receiver of said zone;
- within the scope of the variant mentioned above (system with central unit) coding of the address of the transmitter and coding of a pre-determined value not used as receiver address.

It will be readily understood that, by simply adapting the coding means associated with each local transmitter, it is possible, while using the same local transmitter and receiver products, to readily transform the remote-control system of the invention from operation without central unit to operation with central unit.

BRIEF DESCRIPTION OF THE DRAWINGS

Other features and advantages of the invention will be clearer from the detailed description which follows with reference to the accompanying drawings given solely by way of example and in which :

FIGS. 3 and 4 show partially the schematic form of the transmission signal transmitted by each local transmitter illustrated in FIG. 1 and respectively in FIG. 2.

In FIGS. 1 and 2, the same references refer to the same elements which fulfil the same functions with a view to obtaining the same results.

DESCRIPTION OF THE PREFERRED EMBODIMENTS

Figure 1:
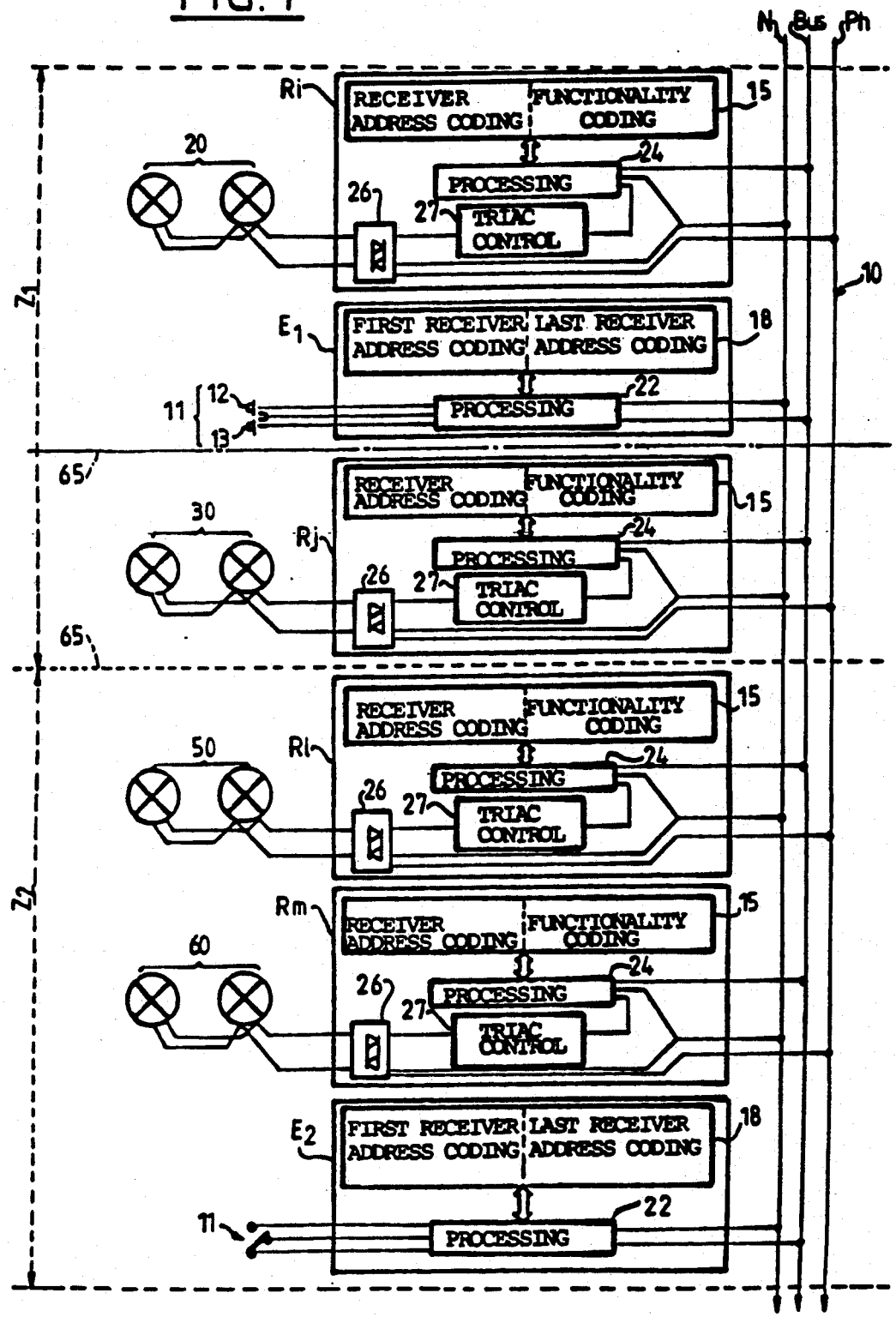
FIG. 1 is a block diagram of one embodiment of a lighting remote-control system in accordance with the invention.

In a preferred embodiment shown in FIG. 1, the remote-control system of the invention is used for controlling lighting in industrial or tertiary field premises incorporating controllable distribution zones, only two of which (referenced $z_1$ and $Z_2$) have been shown in this FIG. 1 simply by way of illustrative example which is in no wise limitative, having configurations which may be modified at the will of the user; by way of example, these zones form offices with movable partitions.

As shown in FIG. 1, the lighting remote-control system comprises a transmission line 10 common to the two zones to be controlled $z_1$ and $Z_2$, and fed by the AC 220 V mains. In this example, the line 10 comprises three relatively rigid conductors, namely :

- a phase conductor Ph,
- a transmission conductor Bus for conveying the transmission signals by carrier currents and connected to the AC 220 V mains through a filter (not shown) having a high impedance to the frequency of the transmission signal, and
- a neutral conductor N.

The transmission line 10 is preferably formed by a prefabricated electric duct comprising a metal tubular channel whose body forms ground and in which the three active conductors such as defined above extend longitudinally and are held in position by insulators.

In this embodiment, FIG. 1, in a zone to be controlled $Z_1$, a local transmitter $E_1$ is provided connected to the transmission line 10 and to which a control member 11 is connected by three wires, formed for example by two push buttons 12 and 13, respectively ON (closed) and OFF (open) as well as two local receivers, referenced $R_i$ and $R_j$ connected to the transmission line 10 and each intended to control, at the order of transmitter $E_1$, lighting appliances 20, respectively 30, which are two in number in the example chosen mounted in series and connected to the output of the corresponding receiver.

Similarly, in the zone to be controlled $Z_2$, a local transmitter $E_2$ is provided connected to the transmission line 10 and to which the control member 11 is connected by three wires, formed here by a two-way type contact, as well as two local receivers, referenced $R_l$ and $R_m$, connected to the transmission line 10 and each intended to control, at the order of transmitter $E_2$, two lighting appliances in series 50, respectively 60.

It should be noted that the number of transmitters, receivers and lighting appliances may be different from one zone to another and be of any number in the same zone to be controlled, it being understood that as a general rule the number of transmitters is less than the number of receivers in the same zone. Furthermore, it is possible to have several transmitters to control the same group of receivers in the same zone.

According to another characteristic of the invention, each local receiver has means for coding a receiver address in digital 8 bit form for example, which is frozen definitively in accordance with a pre-established order at the time of installation of the receivers and which is different from one receiver to another not only in the same zone to be controlled but from one zone to another. Preferably, the address numbers of the receivers are coded consecutively in the same zone to be controlled and from one zone to another.

Thus, in the embodiment illustrated in FIG. 1, receivers $R_i$, $R_j$ of zone $Z_1$ and $R_l$, $R_m$ of zone $Z_2$ have respective address numbers which will be designated by i, j and respectively l,m (each receiver address number going from 1 to 255) which are each coded by coding means 15 in a fixed consecutive order i,j,l,m with $i \neq j \neq l \neq m$.

Still with this example, each local transmitter $E_1$, $E_2$ has means 18 for coding the address numbers of the receivers which it is to control in the zone considered. Preferably, these coding means 18 provide coding of the address number of the first receiver of the corresponding zone to be controlled and coding of the address number of the last receiver of said zone : in the particular case of FIG. 1, the respective address numbers i and j of the two receivers $R_i$ and $R_j$ of zone $Z_1$ are coded in transmitter $E_1$ whereas the respective address numbers l and m of the two receivers $R_l$ and $R_m$ of zone $Z_2$ are coded in transmitter $E_2$.

Encoding such as described above in connection with transmitters $E_1$, $E_2$ and receivers $R_i$, $R_j$, $R_l$, $R_m$ may be carried out using different known devices such for example as coding wheels or labels.

Depending on the closure (lighting up of the lighting appliance) or opening (extinction of the lighting appliance) order given by the control member 11 to each of the local transmitters $E_1$, $E_2$, each transmitter $E_1$, $E_2$ shapes this order by means of a processing circuit 22 in dualism with the address coding means 18 for transmitting to the conductor Bus of line 10 a transmission signal of the amplitude modulated type for example which is then received by each of the receivers of the zone concerned, in this case receivers $R_i$ and $R_j$ controlled by transmitter $E_1$ in zone $Z_1$ and receivers $R_l$ and $R_m$ controlled by transmitter $E_2$ in zone $Z_2$.

In FIG. 3, the basic shape of the transmission signal transmitted by transmitter $E_1$ or $E_2$ has been partially shown. In short, this signal comprises in particular eight data bits corresponding to the address number of the first receiver concerned in the zone to be controlled, in this case i or l, as well as eight data bits corresponding to the address number of the last receiver concerned in said zone, in this case j or m, and a data bit corresponding to the closed state (lighting) or open state (extinction) delivered to the transmitter.

The physical shape of this transmission signal transmitted over the conductor Bus is defined for example by a "1" bit which is represented by an absence of signal and by a "0" bit which is represented by the transmission of an oscillation at a given frequency, superimposed on the mains.

In the zone to be controlled $Z_1$ or $Z_2$, each of the local receivers concerned, namely in the example chosen $R_i$, $R_j$ in zone $Z_1$ or $R_l$, $R_m$ in zone $Z_2$, detects by means of a processing circuit 24 in dualism with the address coding means 15, the transmission signal illustrated in FIG. 3 and controls, for example by means of a triac 26 controlled by a control circuit 27, connected to the processing circuit 24, the lighting or extinction of the lighting appliances 20, 30 in zone $Z_1$ or 50, 60 in zone $Z_2$ depending on the given lighting or extinction order.

Should one of the two zones $Z_1$, $Z_2$ be modified because for example, in offices with movable partitions, of the displacement of one partition 65 (FIG. 1) from its initial position illustrated by broken lines towards a position illustrated by dash-dot lines, the user acts solely on the local transmitters $E_1$ and $E_2$ for modifying the coding of the address numbers of the first and last receivers concerned by this displacement of partition 65; in this example, in transmitter $E_1$, it is sufficient to change only the coding of the address number of the last receiver concerned, which address number is henceforth i, whereas in transmitter $E_2$, only the coding of the address number of the first receiver concerned is to be changed, which address number is now j.

Moreover, it should be noted that the coding means 15 belonging to each local receiver $R_i$, $R_j$, $R_l$, $R_m$ may also provide coding of complementary functionalities of the receiver such for example as the choice of the state (active or inactive) which the output of the corresponding receiver assumes at switch-on.

Figure 2:
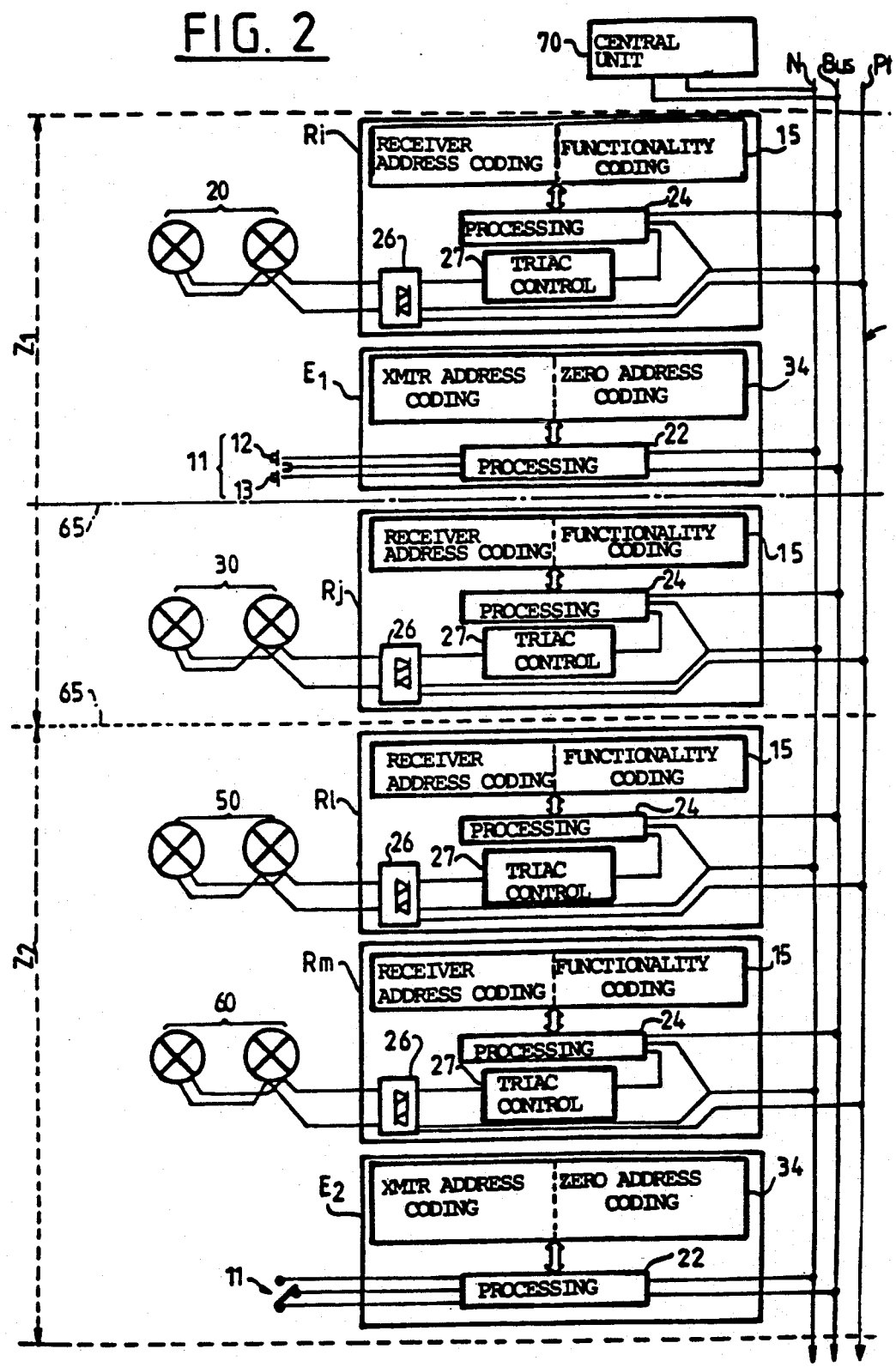
FIG. 2 is a variant of the lighting remote-control system.

In the variant illustrated in FIG. 2, each local receiver $E_1$, $E_2$ has coding means 34 providing both coding of a transmitter address number which will be designated by $\alpha$ for $E_1$ and $\beta$ for $E_2$ and coding of an address of predetermined value not used as receiver address; preferably, this predetermined address value is chosen equal to zero.

Thus, depending on the closure (lighting) order or opening (extinction) order given by the control member 11 to each of the local transmitters $E_1$, $E_2$, each transmitter $E_1$, $E_2$ transmits over the conductor Bus of line 10 a transmission signal which contains in particular, as illustrated in FIG. 4, eight data bits representing the address of the corresponding transmitter, $\alpha$ or $\beta$ in the example chosen, eight data bits representing the zero address and a data bit corresponding to the lighting or extinction state delivered to the transmitter.

Since the local receivers $R_i$, $R_j$, $R_l$, $R_m$ all have respective address numbers i,j,l,m greater than zero, the transmission signal illustrated in FIG. 4 and containing the zero address is not processed by any of the local receivers.

In this variant, a programmable central unit 70 common to the two zones to be controlled $Z_1$ and $Z_2$ is connected to the transmission line 10, between the conductors N and Bus thereof, and is designed so as to be able to detect the transmission signal transmitted by each transmitter $E_1$, $E_2$.

This central unit 70 has a table of correspondence between each transmitter address number and the address numbers of the receivers which are associated therewith in the corresponding zone to be controlled; in this example of FIG. 2, the central unit 70 controls the correspondence in coded form between the address number $\alpha$ of transmitter $E_1$ and the address numbers i,j of the two receivers $R_i$, $R_j$ concerned in zone $Z_1$, the address number $\beta$ of transmitter $E_2$ and the address numbers l,m of the two receivers $R_l$, $R_m$ concerned in zone $Z_2$.

The central unit 70, FIG. 2, plays as it were the role of transmitter/receiver, in that it comprises means adapted for detecting the transmission signal transmitted by each local transmitter $E_1$, $E_2$, as well as means adapted for transmitting, as a function of its correspondence table, another appropriate transmission signal which is received and processed by the local receivers concerned so as to control, in the given order, the lighting or extinction of the lighting appliances 20, 30 in zone $Z_1$ or 50, 60 in zone $Z_2$.

Should one of the two zones $Z_1$, $Z_2$ be modified due, as in the preceding embodiment, to a displacement of partition 65 from its initial position illustrated by broken lines in FIG. 2 to a position illustrated by dash-dot lines in this same figure, the installer acts solely on the correspondence table of the central unit 70 for modifying, by means of a terminal, the correspondence of the address numbers of the transmitters and receivers concerned by this displacement of partition 65; in this example, the modifications to be made consist in causing the address number $\alpha$ of transmitter $E_1$ to correspond with the address number i of receiver $R_i$ and the address number $\beta$ of transmitter $E_2$ with the respective address numbers j,l,m of receivers $R_j$, $R_l$, $R_m$.

It should be added that the central unit 70 may also control complementary functionalities which are delivered thereto by external control members such for example as a lighting level sensor for automatic control of the receivers as a function of the external luminosity, or dialogue with a higher level transmission network.

An important advantage of the invention resides in the fact that it is easy to develop, with the same local transmitter and receiver products, from the remote-control system described in the first embodiment to the remote-control system using the central unit 70 in the variant: for that, it is sufficient to code, in each local transmitter, the address of the transmitter and the zero address in place respectively of the address of the first receiver controlled and the address of the last receiver controlled. In addition, it is also possible to cause transmitters coded in accordance with the first embodiment and transmitters coded for dialoguing with the central unit 70 in the variant to coexist on the same transmission line.

It will be noted that the remote-control system of the invention has been described above in the particular application of lighting control in industrial or tertiary field premises; of course, the invention also applies to any other type of control, such for example as a heating regulation control or else load shedding control, even industrial automatic operation.

What is claimed is:

1. A remote-control system, particularly for lighting, in premises incorporating at least first and second distribution zones with variable conformations, comprising :
   i) a transmission line common to said zones ;
   ii) a plurality of local receivers connected to said transmission line, each receiver being equipped with first means for coding a proper receiver address number and means for controlling user appliances upon detection of said proper address number in a control signal emitted on said transmission line,
   said first zone comprising a first plurality of local receivers having a first assembly of address numbers,
   said second zone comprising a second plurality of local receivers having a second assembly of address numbers,
   iii) at least first and second transmission devices connected to the transmission line, said first transmission device comprising a first control member, means for coding a first transmitter address number, and means delivering on the transmission line, upon actuation of said first control member, a first transmission signal including said first transmitter address number, said second transmission device comprising a second control member, means for coding a second transmitter address number and means for delivering, upon actuation of said second control member, a second transmission signal including said second transmitter address number;

iv) a common programmable central unit connected to the transmission line and comprising means for receiving said transmission signals and for transmitting on the transmission line, a control signal including said first assembly of address numbers upon reception of said first transmitter address number and a control signal including said second assembly of address numbers upon reception of said second transmitter address number.

2. The remote-control system as claimed in claim 1, wherein said coding means belonging to each local transmitting device provide both coding of the transmitter address and coding of a predetermined value not used as said address numbers.

3. The remote-control system as claimed in claim 2, with the local receivers all having an address number greater than zero, wherein said transmitter address number is equal to zero.

* * * * *